(12) United States Patent
Zhu et al.

(10) Patent No.: US 11,400,952 B2
(45) Date of Patent: Aug. 2, 2022

(54) METHOD AND APPARATUS FOR AUTOMATED DRIVING

(71) Applicant: Beijing Baidu Netcom Science and Technology Co., Ltd., Beijing (CN)

(72) Inventors: Houqiang Zhu, Beijing (CN); Pengfei Wei, Beijing (CN); Jia Song, Beijing (CN); Shuyi Chen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/342,772

(22) Filed: Jun. 9, 2021

(65) Prior Publication Data

US 2022/0204010 A1 Jun. 30, 2022

(30) Foreign Application Priority Data

Dec. 24, 2020 (CN) .......................... 202011552036.2

(51) Int. Cl.
| | |
|---|---|
| *B60W 50/06* | (2006.01) |
| *G06N 20/00* | (2019.01) |
| *B60W 60/00* | (2020.01) |
| *B60W 40/06* | (2012.01) |
| *B60W 40/04* | (2006.01) |
| *B60W 40/09* | (2012.01) |

(52) U.S. Cl.
CPC ............ *B60W 50/06* (2013.01); *B60W 40/04* (2013.01); *B60W 40/06* (2013.01); *B60W 40/09* (2013.01); *B60W 60/001* (2020.02); *G06N 20/00* (2019.01); *B60W 2540/30* (2013.01); *B60W 2555/20* (2020.02)

(58) Field of Classification Search
None
See application file for complete search history.

(56) References Cited

U.S. PATENT DOCUMENTS

| | | | |
|---|---|---|---|
| 8,135,507 B2* | 3/2012 | Okabe | G08B 21/06 |
| | | | 701/1 |
| 9,226,004 B1* | 12/2015 | Plante | H04N 21/44 |
| 9,428,195 B1* | 8/2016 | Surpi | G07C 5/085 |
| 9,477,989 B2* | 10/2016 | Grimm | G06Q 40/08 |
| 9,511,778 B1* | 12/2016 | Fuentes | B60W 40/09 |
| 9,628,565 B2* | 4/2017 | Stenneth | B60W 30/09 |
| 11,017,476 B1* | 5/2021 | Gainer | G07C 5/0808 |
| 11,022,971 B2* | 6/2021 | Della Penna | G06F 8/65 |

(Continued)

FOREIGN PATENT DOCUMENTS

| | | |
|---|---|---|
| CN | 106406296 A | 2/2017 |
| CN | 108829087 A | 11/2018 |

(Continued)

*Primary Examiner* — Jonathan M Dager
(74) *Attorney, Agent, or Firm* — Leydig, Voit & Mayer, Ltd.

(57) ABSTRACT

A method and an apparatus for automated driving, a device, and a computer-readable storage medium are provided. The method for automated driving includes: obtaining data associated with a parameter and an external environment of a vehicle, the data being collected according to a collection policy for a target scenario for the vehicle; generating an automated driving model for the target scenario based on the obtained data; and updating the collection policy by testing the automated driving model.

18 Claims, 5 Drawing Sheets

(56) References Cited

U.S. PATENT DOCUMENTS

| | | | |
|---|---|---|---|
| 11,221,623 B2* | 1/2022 | Nojoumian | B60W 40/09 |
| 2014/0210625 A1* | 7/2014 | Nemat-Nasser | G08B 21/06 |
| | | | 340/575 |
| 2014/0214264 A1* | 7/2014 | Campagna | G07C 5/008 |
| | | | 701/32.3 |
| 2018/0053102 A1* | 2/2018 | Martinson | G08G 1/09623 |
| 2018/0174457 A1* | 6/2018 | Taylor | G08G 1/096741 |
| 2019/0147331 A1* | 5/2019 | Arditi | G06V 20/58 |
| | | | 706/20 |
| 2019/0220011 A1* | 7/2019 | Della Penna | G06V 20/58 |
| 2019/0378035 A1* | 12/2019 | Zhang | G06K 9/6253 |
| 2020/0033870 A1* | 1/2020 | Derenick | G06V 20/56 |
| 2021/0239477 A1* | 8/2021 | Norville | G08G 1/207 |
| 2021/0350713 A1* | 11/2021 | Van Meeteren | H04W 4/40 |
| 2022/0001892 A1* | 1/2022 | Fairley | B60W 60/0011 |

FOREIGN PATENT DOCUMENTS

| | | |
|---|---|---|
| CN | 110162003 A | 8/2019 |
| CN | 111338973 A | 6/2020 |

\* cited by examiner

METHOD AND APPARATUS FOR AUTOMATED DRIVING

CROSS REFERENCE TO RELATED APPLICATIONS

This application claims priority to Chinese Patent Application No. 202011552036.2, filed on Dec. 24, 2020, the contents of which are hereby incorporated by reference in their entireties.

FIELD

The present disclosure relates to the field of artificial intelligence, and more specifically, to a method and an apparatus for automated driving, a device, a computer-readable storage medium and a computer program product.

BACKGROUND

As automated driving technologies become popular in life, it is required to efficiently realize the process from collection of automated driving data to its application, so as to meet research and development needs and improve users' experience of automated driving products.

SUMMARY

According to exemplary embodiments of the present disclosure, there are provided a method and an apparatus for automated driving, a device, a computer-readable storage medium, and a computer program product.

In a first aspect of the present disclosure, there is provided a method for automated driving, including: obtaining data associated with a parameter and an external environment of a vehicle, the data being collected according to a collection policy for a target scenario; generating an automated driving model for the target scenario based on the obtained data; and updating the collection policy by testing the automated driving model.

In a second aspect of the present disclosure, there is provided an electronic device, including: one or more processors; and a memory storing one or more programs configured to be executed by the one or more processors, the one or more processors including instructions for: obtaining data associated with a parameter and an external environment of a vehicle, the data being collected according to a collection policy for a target scenario; generating an automated driving model for the target scenario based on the obtained data; and updating the collection policy by testing the automated driving model.

In a third aspect of the present disclosure, there is provided a non-transitory computer-readable storage medium storing one or more programs, the one or more programs comprising instructions, which when executed by one or more processors of an electronic device, cause the electronic device to: obtain data associated with a parameter and an external environment of a vehicle, the data being collected according to a collection policy for a target scenario; generate an automated driving model for the target scenario based on the obtained data; and update the collection policy by testing the automated driving model.

In a fourth aspect of the present disclosure, there is provided an apparatus for automated driving, including: a data obtaining module configured to obtain data associated with a parameter and an external environment of a vehicle, the data being collected according to a collection policy for a target scenario; a model generation module configured to generate an automated driving model for the target scenario based on the obtained data; and a first policy update module configured to update the collection policy by testing the automated driving model.

In a fifth aspect of the present disclosure, there is provided a computer program product comprising computer program instructions, wherein when the computer program instructions are executed by a processor, the method according to the first aspect of the present disclosure is implemented.

It should be understood that the content described in the summary is not intended to limit critical or significant features of the embodiments of the present disclosure, nor is it intended to limit the scope of the present disclosure. Other features of the present disclosure will be easily comprehensible from the following description.

BRIEF DESCRIPTION OF THE DRAWINGS

The above and other features, advantages, and aspects of various embodiments of the present disclosure will be described in conjunction with the drawings and with reference to the following detailed description. In the drawings, the same or similar reference numerals denote the same or similar elements. The drawings are used for a better understanding of the solution and do not constitute a limitation to the present disclosure, in which.

DETAILED DESCRIPTION

Figure 1:
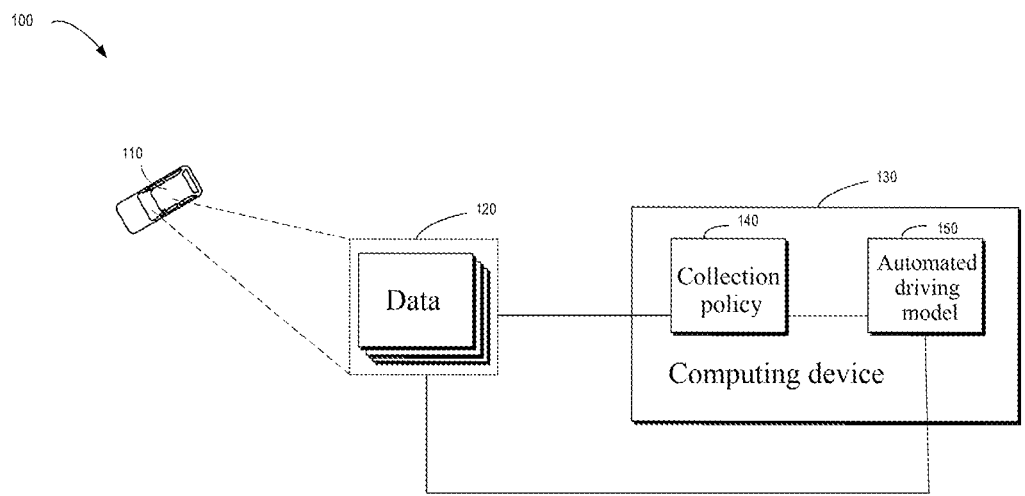
FIG. 1 is a schematic diagram of an exemplary environment in which a plurality of embodiments of the present disclosure can be implemented.

Exemplary embodiments of the present disclosure will be described in more detail below with reference to the accompanying drawings. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and complete understanding of the present disclosure. It should be understood that the accompanying drawings and the embodiments of the present disclosure are merely for illustrative purposes, and are not intended to limit the scope of protection of the present disclosure.

In the description of the embodiments of the present disclosure, the term "comprises", "comprising", "includes", "including", and similar terms should be understood as non-exclusive inclusion, that is, "including but not limited to". The term "based on" should be understood as "at least partially based on". The terms "an embodiment" or "the embodiment" should be understood as "at least one embodiment". The terms "first", "second", and the like may refer to different or same objects. Other explicit and implicit definitions may also be included below.

In the description of the embodiments of the present disclosure, the term "model" can learn an association between an input and its corresponding output from training data, and after the training is completed, a given input is processed based on a parameter set obtained by the training, to generate a corresponding output. The "model" may sometimes be referred to as a "neural network", a "learning model", a "learning network", or a "network". These terms are used interchangeably herein.

Relative automated driving research and development platforms usually use separate data collection, data storage, data processing, model training, and model testing functions. The lack of connection between the functions is disadvantageous regarding rapidly converting real vehicle testing data collected by an enterprise into a valuable automated driving model. Therefore, a main concern today is how to address sharing and unified management of resources and tool chains in automatic data collection, data transmission and classified storage, platform-based data annotation, model training, and testing and result presentation, and thereby effectively reduce research and development costs and cycle of self-driving vehicles and improve automated driving research and development capabilities of enterprises.

As mentioned above, in a relative solution, there is a lack of a closed-loop process that can fully realize collection to application of automated driving data. Due to the separation of various functions, massive data collected cannot be cleaned, annotated, and classified in time. In addition, cooperation with external third-party data annotation agencies incurs the risk of data privacy leakage and differences in annotation results. In addition, training and testing of the model are performed on external platforms or offline, and there is lack of strict and continuous management, which easily causes divorce between data and application. The above-mentioned shortcomings ultimately reduce the overall research and development efficiency and further compromise users' experience of automated driving products.

Exemplary embodiments of the present disclosure propose a solution for automated driving. In this solution, first, in different scenarios, a parameter of a vehicle itself and external environment data of the vehicle are obtained according to different data collection policies. Then, an automated driving model for a corresponding scenario is generated based on the obtained data. Finally, the automated driving model is tested to determine data that the model lacks, and update the collection policy. According to the embodiments of the present disclosure, a closed-loop system of collection to application of data can be implemented, and data can be further generated by testing the model and then is applied in the next round of data collection. In this way, data collection and application can be carried out efficiently, systematically, and in a standard manner, improving research and development efficiency and enhancing users' product experience.

FIG. 1 is a schematic diagram of an exemplary environment 100 in which a plurality of embodiments of the present disclosure can be implemented. It should be understood that the environment 100 shown in FIG. 1 is merely exemplary, and shall not constitute any limitation to the functions and scope of the implementations described in the present disclosure. As shown in FIG. 1, the environment 100 includes a vehicle 110 traveling on a road. In the example of FIG. 1, the vehicle 110 may be any type of vehicle that can carry people and/or objects and move by means of a power system such as an engine, including but not limited to a car, a truck, a bus, an electric vehicle, a motorcycle, a recreational vehicle, a train, etc. In some embodiments, one or more vehicles 110 in the environment 100 may be vehicles capable of automated driving in some degree, and such vehicles are also referred to as driverless vehicles. In some embodiments, the vehicle 110 may alternatively be a vehicle that is not capable of automated driving. Although one vehicle 110 is shown in the figure, this is only exemplary, and a different quantity of vehicles 110 may be present, which is not limited here in the present disclosure.

The vehicle 110 may be communicatively coupled to a computing device 130. Although shown as a separate entity, the computing device 130 may be embedded in the vehicle 110. Alternatively, the computing device 130 may be an entity external to the vehicle 110 and may communicate with the vehicle 110 via a wireless network. The computing device 130 may be any device with a computing capability. As a non-limiting example, the computing device 130 may be any type of fixed computing device, mobile computing device, or portable computing device, including but not limited to a desktop computer, a laptop computer, a notebook computer, a netbook computer, a tablet computer, a multimedia computer, a mobile phone, etc. All or some of the components of the computing device 130 can be distributed on cloud. The computing device 130 at least includes a processor, a memory, and other components that are usually present in a general-purpose computer, so as to implement functions such as computing, storage, communication, and control.

The computing device 130 may include a collection policy 140 and an automated driving model 150. The collection policy is the basis for directing the vehicle 110 to perform data collection. Although the figure shows one collection policy 140, the computing device 130 may include a plurality of collection policies, wherein each collection policy corresponds to a corresponding scenario (for example, different weather, different road conditions, or different driving scenarios) for the vehicle 110.

The computing device 130 may configure a list of a plurality of collection policies on the server side, and send the list to the vehicle 110 via a T-box using a wireless network. Then the vehicle 110 can automatically perform collection of data 120 offline in different scenarios according to various collection policies 140 in the list of collection policies. Alternatively, the computing device 130 may send the collection policy to the vehicle 110 online in real time for the collection of the data 120, which is not limited here in the present disclosure.

In some embodiments, the vehicle 110 may use its own sensor to obtain an image or a video of a physical environment in which the vehicle 110 is located as the data 120. For example, in a scenario such as level L3 automated driving, one forward wide-angle camera and four fisheye cameras may be used to collect an image or a video. The image or video may also be obtained in any suitable manner. The vehicle 110 may further use a sensor to obtain vehicle body status data, such as a control status of a brake and an accelerator, a steering wheel rotation angle, or a wiper stop position, as the data 120.

Alternatively, in some embodiments, the vehicle 110 may obtain an image as the data 120 via other devices in an intelligent transportation system. For example, the vehicle 110 may communicate with a roadside camera around the vehicle to obtain an image and a video including the vehicle 110 itself as the data 120, or may obtain a status of a signal light as the data 120 by means of communication with a smart signal light.

The computing device 130 may obtain the collected data 120 from the vehicle 110. In some embodiments, the computing device 130 may obtain the data 120 from the vehicle 110 in real time. For example, when the vehicle 110 does not have a mass storage hard disk, the data 120 is collected and then uploaded to the cloud by default in real time for storage. During data uploading, encryption processing may be performed on the data by using an encryption software development kit (SDK) technology, and data transmission may be performed in the form of breakpoint continuous transmission. The data 120 may also be transmitted in other suitable manners, which is not limited here in the present disclosure.

Alternatively, in some embodiments, when the vehicle 110 collects data in poor network conditions or in the presence of other transmission restrictions, the vehicle 110 may first write the collected data into an embedded multimedia controller (eMMC) for data caching. When an upload condition is satisfied, the vehicle 110 sequentially uploads the cached data according to a data priority and a time sequence. The cached data is erased immediately after being uploaded, to free up space for subsequent tasks.

The computing device 130 may use the obtained data 120 to generate the automated driving model 150. The computing device 130 may further test the automated driving model 150 and update the collection policy 140 according to a testing result. This will be described in detail below in conjunction with FIGS. 2 and 3.

Figure 2:
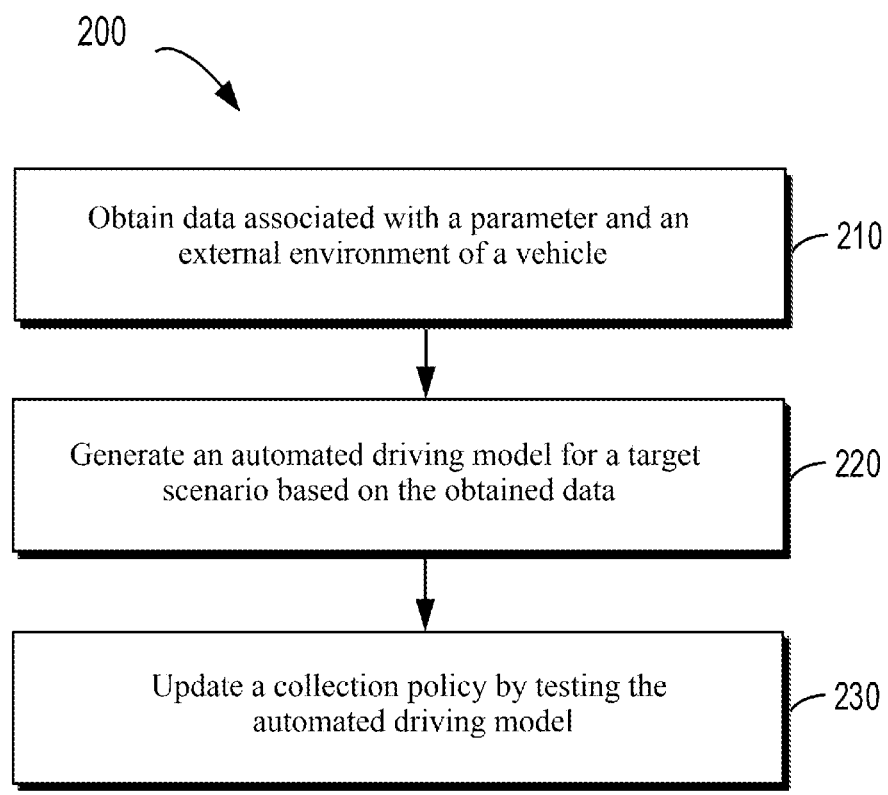
FIG. 2 is a schematic flowchart of an example of a process for automated driving according to some embodiments of the present disclosure.

FIG. 2 is a schematic flowchart of an example of a process 200 for automated driving according to some embodiments of the present disclosure. The process 200 may be implemented by the computing device 130.

At 210, the computing device 130 obtains data 120 associated with a parameter and an external environment of a vehicle 110. As described above, the data 120 is collected by the vehicle 110 according to a collection policy 140 for a target scenario. The collection policy 130 may include at least one of the following: a collection trigger condition that causes the data to be collected, a type of a sensor that collects the data, duration of collecting the data, frequency of collecting the data, and a priority of collecting the data.

In some embodiments, the target scenario may be a raining scenario. The collection policy 140 for the raining scenario may include: the collection trigger condition is a wiper being on for 10 seconds or longer; an ultrasonic wave sensor (for ranging), a sensor with a fisheye lens (for collecting an image), and a sensor for records a status of an accelerator and a brake (for the parameter of the vehicle itself) are used; the collection time lasts until the wiper has stopped for 10s or longer, and the collection frequency is 10 Hz; and the priority of collecting the data is a priority of a rainy day data collection task being higher than that of, for example, a data collection task in a highway scenario. Then, when the wiper is on for 10s or longer, the collection policy 140 for the raining scenario is triggered, such that the data 120 is collected according to the collection policy 140. Subsequently, the computing device 110 may obtain, in real time or later as described above, the status of the accelerator and the brake and external image and distance information of the vehicle 110 from the vehicle 110 as the data 120. The priority of collecting the data described above is merely exemplary. If a plurality of collection policies for different target scenarios are triggered, the collection task with the highest priority may be performed. Alternatively, several collection tasks with top-ranked priorities may be performed, which is not limited here in the present disclosure.

Alternatively, in some embodiments, the target scenario may be a highway scenario. The collection policy 140 for the highway scenario may include: the collection trigger condition is an average speed within 10 seconds being greater than 100 km/h; an ultrasonic wave sensor (for ranging), a sensor with a fisheye lens (for collecting an image), and an inertial measurement unit (IMU) (for the parameter of the vehicle itself) are used; and the collection time lasts until the average speed within 10 seconds is less than 80 km/h, and the collection frequency is 20 Hz.

The target scenario and the collection policy described above are merely exemplary, wherein the target scenario includes but is not limited to: a rainy day scenario, a parking scenario, a lane changing scenario, a vehicle-following scenario, an urban scenario, a rural scenario, a mountain land scenario, and a highway scenario. A hybrid scenario may also be created, e.g., a rainy day highway scenario. In addition, different collection policies may be set according to subsequent training model requirements, fault analysis, and user requirements, which is not limited here in the present disclosure.

Note that the above numbers are merely exemplary, and different numbers may be set for the target scenario and model requirements, which is not limited here in the present disclosure.

At 220, the computing device 130 generates an automated driving model 150 for the target scenario based on the obtained data 120. For example, the computing device 130 selects the associated data 120 according to a model to be generated, and then uses the data 120 to train the model to obtain the automated driving model 150.

In an example, the foregoing data 120 has been classified (or labeled) when collected. For example, the label is its target scenario, such as a rainy day scenario, a parking scenario, a lane changing scenario, a vehicle-following scenario, an urban scenario, and a highway scenario.

In some embodiments, after obtaining the labeled data 120, the computing device 130 may use an appropriate algorithm to perform feature analysis on the collected image, video, and sound data, to sub-classify them (making them have additional labels). Alternatively, in some embodiments, the data may be sub-classified manually. As a result, different data 120 may have different labels, that is, the data 120 is classified, which facilitates subsequent query and use of the data 120.

Additionally or alternatively, the computing device 130 may further classify the data 120 into three types: unprocessed, valid, and invalid. Unprocessed means that the data 120 has not been cleaned or annotated. Valid means that the data 120 has been cleaned and annotated. Invalid means that the type and quality of the data does not satisfy the corresponding requirements. The cleaning and annotation described above may be performed manually or by machine, which is not limited here in the present disclosure. The data annotation can be done with annotation tools such as point/line annotation based on Web, image classification, an object detection frame, image semantic segmentation, video annotation, three dimensional (3D) cube annotation, and point cloud data annotation. For example, the data annotation may be performed in an interface by annotation personnel with the foregoing various annotation tools, while the annotation personnel are not allowed to perform any form of data downloading. This realizes the protection of data privacy. This is merely exemplary, and the data annotation can also be implemented by using various models and algorithms that are present or will be developed in the future, which is not limited here in the present disclosure.

The data 120 may include at least one of the following: manual driving data, automated driving data, field testing data, real road data, and traffic accident data. In view of a limited amount of field testing data and the deviation of a testing environment from real road sections, using massive real road data of users on the precondition that the users sign an agreement can further improve the accuracy of subsequent model training.

To generate the automated driving model 150, the computing device 130 may first determine training data from the data 120. Then, first annotated data corresponding to the training data is obtained. Finally, the first annotated data is used to train a pre-built initial model, to obtain the automated driving model 150.

In an embodiment, the computing device 130 may first determine a type of the automated driving model 150 to be generated, for example, a rainy day assisted driving model. Then, data labeled as "rainy day" is obtained from the data 120 and used as the training data. Next, the computing device 130 may obtain the first annotated data for the training data, for example, by using the foregoing label classified as valid. The computing device 130 then selects an appropriate initial model. The initial training model includes but is not limited to a support vector machine (SVM) model, a Bayesian model, a random forest model, and various deep learning/neural network models, such as a convolutional neural network (CNN) and a recurrent neural network (RNN). Finally, the computing device 130 obtains the automated driving model for rainy day assisted driving by using the foregoing training data, the first annotated data, and the pre-built initial training model. The computing device 130 may further present information such as a model status and a convergence degree in a real-time log result for research and development personnel to control the training progress.

Alternatively, in some embodiments, the computing device 130 may also use data obtained by other means to train a model or use the foregoing data 120 to improve a corresponding automated driving model, which is not limited here in the present disclosure.

Additionally or alternatively, the foregoing data 120 may also be retrieved and analyzed for fault diagnosis, as well as the confirmation of responsibility after the assessment of returned data of an accident scenario by a plurality of parties such as insurance and after-sales. The computing device 130 may retrieve and download data according to filtered items, and then play fisheye pictures and wide-angle pictures in consecutive frames, to implement visualized manual review. At the same time, log files are used as a supplement to locate status data such as events and fault codes recorded by a vehicle at a specific time point, to provide more information for the review requirements.

Figure 3:
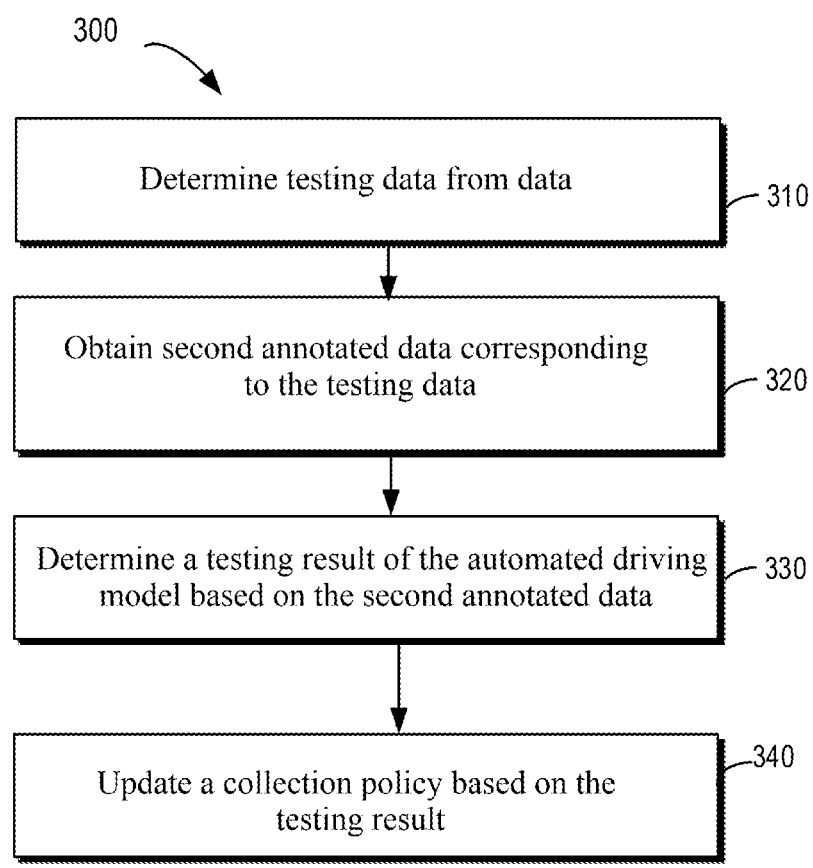
FIG. 3 is a schematic flowchart of an example of a process of updating a collection policy according to some embodiments of the present disclosure.

At 230, the computing device 130 updates the collection policy by testing the automated driving model. The matching process will be further described in conjunction with FIG. 3. FIG. 3 is a schematic flowchart of an example of a process 300 of updating a collection policy according to some embodiments of the present disclosure.

At 310, the computing device 130 determines testing data from the data. The testing data is different from the training data. For example, the computing device 130 may determine the testing data from the data 120 according to a label and a use scenario related to the automated driving model 150 to be tested. The testing data is different from the foregoing training data used for training the automated driving model 150.

In some embodiments, a part of the selected data 120 may be used as the training data, and the remaining data may be used as the testing data. Alternatively, in some embodiments, other data may be obtained from the outside as the testing data, which is not limited here in the present disclosure.

At 320, the computing device 130 obtains second annotated data corresponding to the testing data. For example, the computing device 130 may obtain the second annotated data for the testing data, e.g., by using the foregoing label classified as valid. For the testing data obtained from the outside, the computing device 130 may annotate the testing data to obtain the second annotated data.

At 330, the computing device 130 determines a testing result of the automated driving model based on the second annotated data. For example, after obtaining the second annotated data, the computing device 130 may test different versions of automated driving models 150 to obtain scores as the result. The score result can intuitively indicate the performance of each version of model in different fields and different dimensional indicators.

At 340, the computing device 130 updates the collection policy based on the testing result. For example, the computing device 130 may determine data for the training model according to the testing result of the model, and thereby update the collection policy by adding a collection policy for this type of data to the original collection policy.

In some embodiments, after testing the automated driving model for rainy days, the computing device 130 finds that the score of the testing result is comparatively low. In addition, the computing device 130 determines that the low score is caused due to reflection of light by roads. Then the computing device 130 may configure and collect image data of roads with reflection of light due to the presence of water or snow accumulation, and use the configured information to update the collection policy. Subsequently, after collecting the data, the computing device 130 may use the data to further train the model to improve the model.

Additionally or alternatively, the computing device 130 may also update the collection policy according to requirements of users and fault analysis of the research and development personnel.

The present disclosure proposes the method for collection to application of data of automated driving, which integrates processes such as data collection, data storage and transmission, data classification and management, data security, data cleaning and annotation, data training, data testing, and problem feedback. Automatic collection of the data can be implemented and processing of the data can be completed, without the users' perception. The testing result according to the final model is used as a requirement on a new round of data collection, such that the shortcomings of the model can be continuously improved. In this way, data collection and application can be carried out efficiently, systematically, and in a standard manner, improving research and development efficiency and enhancing users' product experience.

Figure 4:
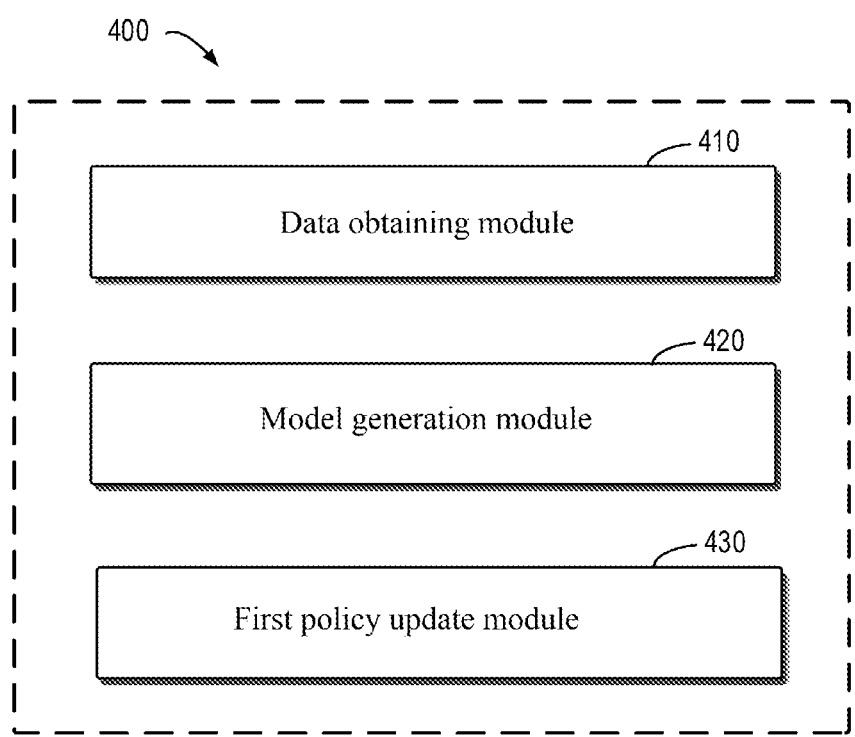
FIG. 4 is a schematic block diagram of an apparatus for automated driving according to an embodiment of the present disclosure.

FIG. 4 is a schematic block diagram of an apparatus 400 for automated driving according to an embodiment of the present disclosure. As shown in FIG. 4, the apparatus 400 includes: a data obtaining module 410 configured to obtain data associated with a parameter and an external environment of a vehicle, the data being collected according to a collection policy for a target scenario; a model generation module 420 configured to generate an automated driving model for the target scenario based on the obtained data; and a first policy update module 430 configured to update the collection policy by testing the automated driving model.

In some embodiments, the model generation module 420 may include: a first data determining module configured to determine training data from the data; a first annotated data obtaining module configured to obtain first annotated data corresponding to the training data; and a model training module configured to use the first annotated data to train a pre-built initial model, so as to obtain the automated driving model.

In some embodiments, the first policy update module 430 may include: a second data determining module configured to determine testing data from the data, the testing data being different from the training data; a second annotated data obtaining module configured to obtain second annotated data corresponding to the testing data; a testing module configured to determine a testing result of the automated driving model based on the second annotated data; and a second policy update module configured to update the collection policy based on the testing result.

In some embodiments, the collection policy includes at least one of the following: a collection trigger condition that causes the data to be collected, a type of a sensor that collects the data, duration of collecting the data, frequency of collecting the data, and a priority of collecting the data.

In some embodiments, the data includes at least one of the following: manual driving data, automated driving data, field testing data, real road data, and traffic accident data.

In some embodiments, the target scenario includes at least one of the following: a rainy day scenario, a parking scenario, a lane changing scenario, a vehicle-following scenario, an urban scenario, a rural scenario, a mountain land scenario, and a highway scenario.

Figure 5:
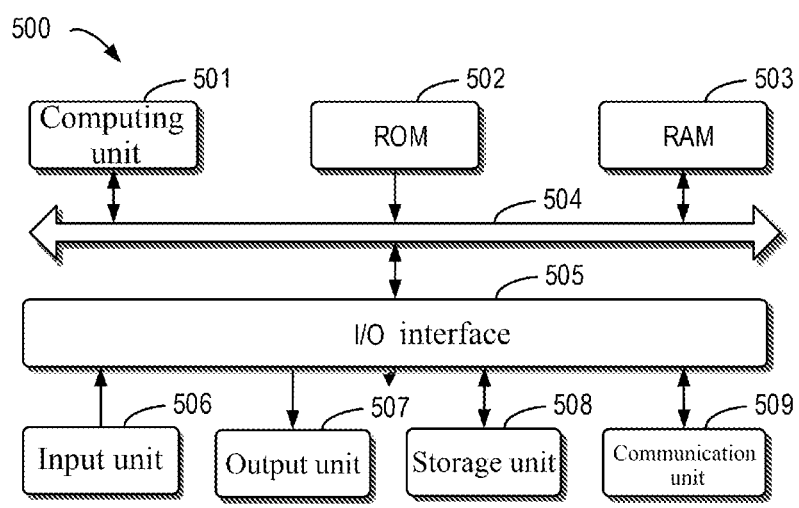
FIG. 5 is a block diagram of a computing device that can implement a plurality of embodiments of the present disclosure.

FIG. 5 is a schematic block diagram of an example electronic device 500 that can be configured to implement an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 5, the device 500 includes a computing unit 501, which may perform various appropriate actions and processing according to a computer program stored in a read-only memory (ROM) 502 or a computer program loaded from a storage unit 508 to a random access memory (RAM) 503. The RAM 503 may further store various programs and data for the operation of the device 500. The computing unit 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard or a mouse; an output unit 507, such as various types of displays or speakers; a storage unit 508, such as a magnetic disk or an optical disc; and a communication unit 509, such as a network interface card, a modem, or a wireless communication transceiver. The communication unit 509 allows the device 500 to exchange information/data with other devices via a computer network such as the Internet and/or various telecommunications networks.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs the various methods and processing described above, for example, the processes 200 and 300. For example, in some embodiments, the processes 200 and 300 may be implemented as a computer software program, which is tangibly contained in a machine-readable medium, such as the storage unit 508. In some embodiments, a part or all of the computer program may be loaded and/or installed onto the device 500 via the ROM 502 and/or the communication unit 509. When the computer program is loaded to the RAM 503 and executed by the computing unit 501, one or more steps of the processes 200 and 300 described above can be performed. Alternatively, in other embodiments, the computing unit 501 may be configured, by any other suitable means (for example, by means of firmware), to perform the processes 200 and 300.

Various implementations of the foregoing systems and technologies described herein can be implemented in a digital electronic circuit system, an integrated circuit system, a field programmable gate array (FPGA), an application-specific integrated circuit (ASIC), an application-specific standard product (ASSP), a system-on-chip (SOC) system, a load programmable logic device (CPLD), computer hardware, firmware, software, and/or a combination thereof. These various implementations may include: the systems and technologies are implemented in one or more computer programs, wherein the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program code for implementing the method of the present disclosure can be written in any combination of one or more programming languages. The program code may be provided to a general-purpose computer, a special-purpose computer, or a processor or controller of other programmable data processing devices, such that when the program code is executed by the processor or controller, the functions/operations specified in the flowcharts and/or block diagrams are implemented. The program code may be completely executed on a machine, or partially executed on a machine, or may be, as an independent software package, partially executed on a machine and partially executed on a remote machine, or completely executed on a remote machine or server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable storage medium may include but is not limited to, an electronic, magnetic, optical, electromagnetic, infrared, or semiconductor system, apparatus, or device, or any combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other by means of digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, also referred to as a cloud computing server or a cloud host, and is a host product in a cloud computing service system, to overcome the shortcomings of difficult management and weak service scalability in conventional physical host and virtual private server (VPS) services. The server may also be a server in a distributed system, or a server combined with a blockchain.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

The specific implementations above do not constitute a limitation to the protection scope of the present disclosure. Those skilled in the art should understand that various modifications, combinations, sub-combinations, and replacements can be made according to design requirements and other factors. Any modifications, equivalent replacements, improvements, etc. within the spirit and principle of the present disclosure shall fall within the protection scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for automated driving, comprising:
collecting, by an electronic device, data associated with a parameter and an external environment of a vehicle according to an original collection policy for a target scenario, wherein the original collection policy comprises at least a collection trigger condition that causes the data to be collected in the target scenario, and wherein the data is labelled for the target scenario while being collected;
generating, by the electronic device, an automated driving model for the target scenario based on the collected data, wherein the automated driving model assists driving in the target scenario;
determining, by the electronic device, a type of data that the automated driving model lacks by testing the automated driving model; and
updating, by the electronic device, the original collection policy by adding a collection policy for the type of data to the original collection policy.

2. The method according to claim 1, wherein the generating the automated driving model for the target scenario based on the collected data comprises:
determining training data from the data;
obtaining first annotated data corresponding to the training data;
using the first annotated data to train a pre-built initial model; and
obtaining the automated driving model based on the trained pre-built initial model.

3. The method according to claim 2, wherein the determining a type of data that the automated driving model lacks by testing the automated driving model comprises:
determining testing data from the data, the testing data being different from the training data;
obtaining second annotated data corresponding to the testing data; and
determining a testing result of the automated driving model based on the second annotated data, wherein the testing result indicates the type of data that the automated driving model lacks.

4. The method according to claim 1, wherein the original collection policy further comprises at least one of a type of a sensor that collects the data, a duration of collecting the data, a frequency of collecting the data, and a priority of collecting the data.

5. The method according to claim 1, wherein the data comprises at least one of manual driving data, automated driving data, field testing data, real road data, and traffic accident data.

6. The method according to claim 1, wherein the target scenario comprises at least one of a rainy day scenario, a parking scenario, a lane changing scenario, a vehicle-following scenario, an urban scenario, a rural scenario, a mountain land scenario, and a highway scenario.

7. An electronic device, comprising:
one or more processors; and
a memory coupled to the one or more processors and having one or more programs stored thereon, the one or more programs, when executed by the one or more processors, causing the one or more processors to facilitate:
collecting data associated with a parameter and an external environment of a vehicle according to an original collection policy for a target scenario, wherein the original collection policy comprises at least a collection trigger condition that causes the data to be collected in the target scenario, and wherein the data is labelled for the target scenario while being collected;
generating an automated driving model for the target scenario based on the collected data, wherein the automated driving model assists driving in the target scenario;
determining a type of data that the automated driving model lacks by testing the automated driving model; and
updating the original collection policy by adding a collection policy for the type of data to the original collection policy.

8. The electronic device according to claim 7, wherein the generating the automated driving model for the target scenario based on the collected data comprises the one or more processors executing the one or more programs to facilitate:
determining training data from the data;
obtaining first annotated data corresponding to the training data;
using the first annotated data to train a pre-built initial model; and
obtaining the automated driving model based on the trained pre-built initial model.

9. The electronic device according to claim 8, wherein the determining a type of data that the automated driving model lacks by testing the automated driving model comprises the one or more processors executing the one or more programs to facilitate:
determining testing data from the data, the testing data being different from the training data;
obtaining second annotated data corresponding to the testing data; and
determining a testing result of the automated driving model based on the second annotated data, wherein the testing result indicates the type of data that the automated driving model lacks.

10. The electronic device according to claim 7, wherein the original collection policy further comprises at least one of a type of a sensor that collects the data, a duration of collecting the data, a frequency of collecting the data, and a priority of collecting the data.

11. The electronic device according to claim 7, wherein the data comprises at least one of manual driving data, automated driving data, field testing data, real road data, and traffic accident data.

12. The electronic device according to claim 7, wherein the target scenario comprises at least one of a rainy day scenario, a parking scenario, a lane changing scenario, a vehicle-following scenario, an urban scenario, a rural scenario, a mountain land scenario, and a highway scenario.

13. A non-transitory computer-readable storage medium storing one or more programs, the one or more programs comprising instructions, which when executed by one or more processors of an electronic device, cause the electronic device to:
collect data associated with a parameter and an external environment of a vehicle according to an original collection policy for a target scenario, wherein the original collection policy comprises at least a collection trigger condition that causes the data to be collected in the target scenario, and wherein the data is labelled for the target scenario while being collected;
generate an automated driving model for the target scenario based on the collected data, wherein the automated driving model assists driving in the target scenario;
determine a type of data that the automated driving model lacks by testing the automated driving model; and
update the original collection policy by adding a collection policy for the type of data to the original collection policy.

14. The non-transitory computer-readable storage medium according to claim 13, wherein the generating the automated driving model for the target scenario based on the collected data comprises the one or more processors of the electronic device executing the one or more programs to cause the electronic device to:
determine training data from the data;
obtain first annotated data corresponding to the training data;
use the first annotated data to train a pre-built initial model; and
obtain the automated driving model based on the trained pre-built initial model.

15. The non-transitory computer-readable storage medium according to claim 14, wherein the determining a type of data that the automated driving model lacks by testing the automated driving model comprises the one or more processors of the electronic device executing the one or more programs to cause the electronic device to:
determine testing data from the data, the testing data being different from the training data;
obtain second annotated data corresponding to the testing data; and
determine a testing result of the automated driving model based on the second annotated data, wherein the testing result indicates the type of data that the automated driving model lacks.

16. The non-transitory computer-readable storage medium according to claim 13, wherein the original collection policy further comprises at least one of a type of a sensor that collects the data, a duration of collecting the data, a frequency of collecting the data, and a priority of collecting the data.

17. The non-transitory computer-readable storage medium according to claim 13, wherein the data comprises at least one of manual driving data, automated driving data, field testing data, real road data, and traffic accident data.

18. The non-transitory computer-readable storage medium according to claim 13, wherein the target scenario comprises at least one of a rainy day scenario, a parking scenario, a lane changing scenario, a vehicle-following scenario, an urban scenario, a rural scenario, a mountain land scenario, and a highway scenario.

\* \* \* \* \*